United States Patent [19]

Seipp

[11] 4,050,098
[45] Sept. 20, 1977

[54] SELF-ADDRESSING MODULES FOR PROGRAMMABLE CONTROLLER

[75] Inventor: William H. Seipp, Bettendorf, Iowa

[73] Assignee: Gulf & Western Industries, Inc., New York, N.Y.

[21] Appl. No.: 632,257

[22] Filed: Nov. 17, 1975

[51] Int. Cl.² .............................................. G06F 9/00
[52] U.S. Cl. ..................................................... 364/900
[58] Field of Search ..................................... 340/172.5

[56] References Cited

U.S. PATENT DOCUMENTS

| | | | |
|---|---|---|---|
| 3,810,104 | 5/1974 | Markley | 340/172.5 |
| 3,810,118 | 5/1974 | Kiffmeyer | 340/172.5 |
| 3,849,765 | 11/1974 | Hamano | 340/172.5 |

*Primary Examiner*—Joseph M. Thesz
*Assistant Examiner*—C. T. Bartz
*Attorney, Agent, or Firm*—Meyer, Tilberry & Body

[57] ABSTRACT

An improvement in a module for a programmable controller including logic circuits and means for enabling the circuits upon receipt of a module enabling signal. The improvement includes a first set of input terminals arranged on the module and in a preselected pattern having a successive numerical order of 1, 2, 3 ... n; a set of output terminals arranged on the module in the preselected pattern; means on the module for connecting the input terminal at position number one to the enabling means; means on the module for connecting each of the remaining input terminals to output terminals in the corresponding next lower numerical position of the preselected pattern of output terminals.

6 Claims, 3 Drawing Figures

SELF-ADDRESSING MODULES FOR PROGRAMMABLE CONTROLLER

This invention relates to the art of programmable controllers and more particularly to an improved self-addressing system for various modules of a programmable controller system.

the invention is particularly applicable for input/output (I/O) modules in a programmable controller system and will be described with particular reference thereto; however, the invention is much broader and may be used for various modules to be selectively addressed in a programmable controller.

BACKGROUND OF INVENTION

In recent years, programmable controllers have become quite popular in controlling various industrial processes. These controllers generally include a central processing unit which is programmed to perform a series of steps which include controlling the condition of various output terminals and reading the output conditions for subsequent processing. Generally, the output signals and the input conditions from output circuits are directed through a seaprrate module. Since a large number of output units are required in most situations, the capabilities of a single module are exceeded. Thus, except for very simple applications, a series of modules for controlling the various outputs are required. These modules are generally referred to as input/output or I/O modules, since they are capable of both setting an output and reading the condition of the various outputs controlled by the individul modules. The need for a plurality of output modules to accommodate the large number of output units dictates that a programmable controller system must include a number of individual I/O modules. Thus, in order to set a selected output and/or read the selected output, the particular module connected to selected outputs must be addressed by the programmable controller. This is generally done by decoding four address lines to produce one of sixteen separate codes on sixteen parallel lines. In this manner, up to sixteen individual modules can be used for receiving from and transmitting information to the various output units. In the past, each of the individual modules was assigned a number and the module of a selected number was provided with a decoding network of logic gates so that an enable signal on one of the parallel lines or conductors would actuate a selected one of the I/O modules. This general arrangement has certain disadvantages. Each of the modules must be provided with a selected, different decoding network so that two or more modules will not be enabled simultaneously. Such decoding networks also increase the time to transmit data through the modules. In addition, the particular decoded number of a module must be marked on the module or otherwise recorded so that an assembler of the system will know which module is used for controlling which connected output units.

THE INVENTION

The present invention overcomes the difficulties in the prior arrangement for assembling and addressing the various input/output (I/O) modules so that a decoder network is not needed in the module and each module can be used universally in various positions in the programmable controller system.

In accordance with the present invention, there is provided an improvement in a module for a programmable controller which module includes logic circuits and means for enabling the circuits upon receipt of a module enabling signal. This improvement includes a set of input terminals arranged on the module in a preselected pattern having a successive numerical order of 1, 2, 3 . . . $n$; a set of ouput terminals arranged on the module in the preselected pattern; means on the module for connecting the input terminal in the number one position to the enabling means; means on the module for connecting each of the remaining input terminals to the output terminals in the corresponding next lower numerical position of the preselected pattern about the terminals.

By using this invention, all modules may be constructed with the same input and output terminal arrangement and are compatible with all input/output units of the programmable controller. The modules may be connected together with the input terminals of a successive module being connected directly to output terminals of a prior module. In addition, coupling cables or motherboard connecting conductors can interconnect successive modules. The module placed in the first position of the controller receives an enabling signal on one of its input terminals. The rest of the enabling signals pass through the first modules to the next successive module. The module in the second position is enabled by a second addressing signal. This can be continued to 16 different modules. In this manner, a module in the first position will be designated the first or Position No. 1 module and will receive an enabling signal when the controller addresses the first input/output address. The module in the second receptacle will be enabled when a second address is transmitted by the controller. This continues with successive modules being addressed according to their position in the controller without requiring any module address decoding on the module itself.

By providing this self-addressing feature for the module, there is less time delay after addressing a module before information can be directed to and from the module. A decoding system on the module requires some time to be activated prior to actual transmission of data. In addition, there is no need to know the address of a module in advance to assemble it in the programmable controller. Each module has the address corresponding to the position in which it is placed and no decoding network is needed on the module. All modules are constructed in the same manner and can fit any I/O position. The position of assembly determines the address of the module. This is quite convenient since the first position will contain the module with the first address and the second position will contain the module with the second address. This system continues to the maximum boards in the I/O receptacles of the controller.

The primary object of the present invention is the provision of a self-addressing system for modules of a programmable controller, which system reduces the addressing time of the module and allows for universal module design.

Another object of the present invention is the provision of a self-addressing system for modules of a programmable controller, which system does not require a logic decoder network on the modules.

Still a further object of the present invention is the provision of a self-addressing system as discussed above, which system allows the use of a module in various positions and the controller position determines the module address.

BRIEF DESCRIPTION OF DRAWINGS

These and other objects and advantages will become apparent from the following description taken together with the accompanying drawings in which.

DESCRIPTION OF PREFERRED EMBODIMENT

Figure 1:
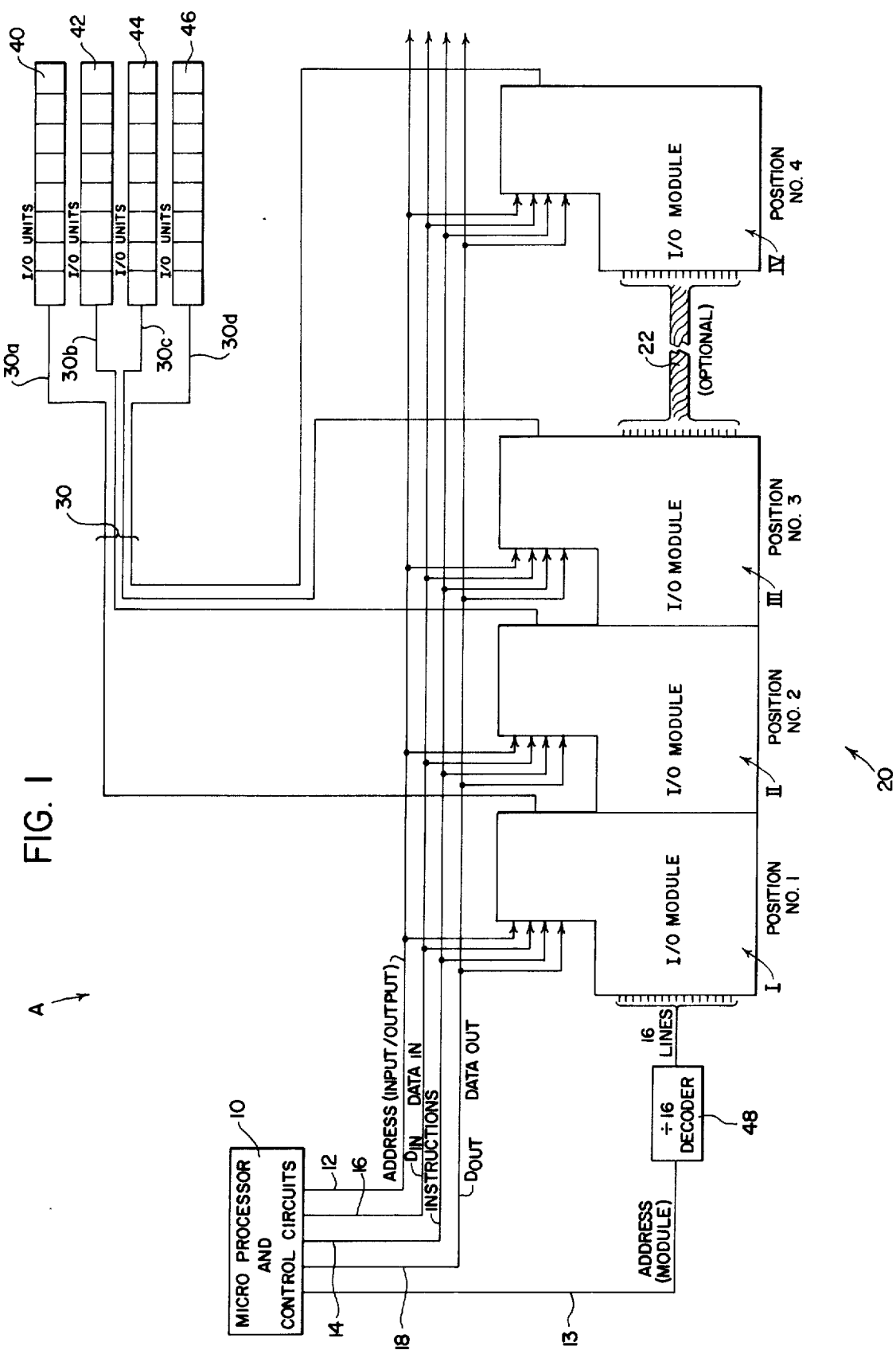
FIG. 1 is a schematic and pictorial view illustrating the environment of the preferred embodiment of the present invention.

Referring now to the drawings, wherein the showings are for the purpose of illustrating a preferred embodiment of the invention only, and not for the purpose of limiting same, FIG.1 shows a programmable controller A incorporating a microprocessor unit 10 having standard programmable components, such as memories, and other associated control circuits. Address lines 12, 13 instruction lines 14 and data line or lines 16, 18 are directed from microprocessor unit 10 to control certain input and output data. Controller A includes an input-/ouput module assembly 20 having modules I, II, III and IV. The number of modules shown is only illustrative in nature. Assembly 20 includes a mounting arrangement whereby the modules may be plugged into each other as modules I, II and III or connected by a harness 22 as between modules III and IV. Module I is inserted into controller A at the No. 1 position. In a like manner, module II is in the No. 2 position, and module III is in the No. 3 position and module IV is in the No. 4 position. This sequence is continued with the successive positions in assembly 20 being occupied by modules as additional outputs and inputs are required for programmable controller A. Interconnecting harness 30 is connected to a series of input/output units or tracks 40, 42, 44 and 46 by harness sections 30a, 30b, 30c and 30d, respectively. Of course, a plurality of these tracks are available for a controller requiring additional outputs. The module address codes on lines 13 are decoded by a divide by sixteen decoder 48.

In operation, microprocessor unit 10 and its related circuitry and components provide addresses to enable a selected one of the modules I-IV and instructions for the function to be performed by the selected module. The address on lines 13 determines which module is activated or enabled, and the address on lines 12 selects the exact input or output circuit of the module to be addressed. An instruction code on lines 14 indicates whether or not data is to be inputted on line 16 or outputted on line 18 from the particular input/output units of tracks 40, 42, 44 and 46. Data on line 16 is transmitted to microprocessor unit 10 and its related circuitry for processing in accordnce with standard practice. As so far explained, controller A is similar to other programmable controllers. The present invention relates to the self-addressing feature of the individual modules I-IV.

Figure 2:
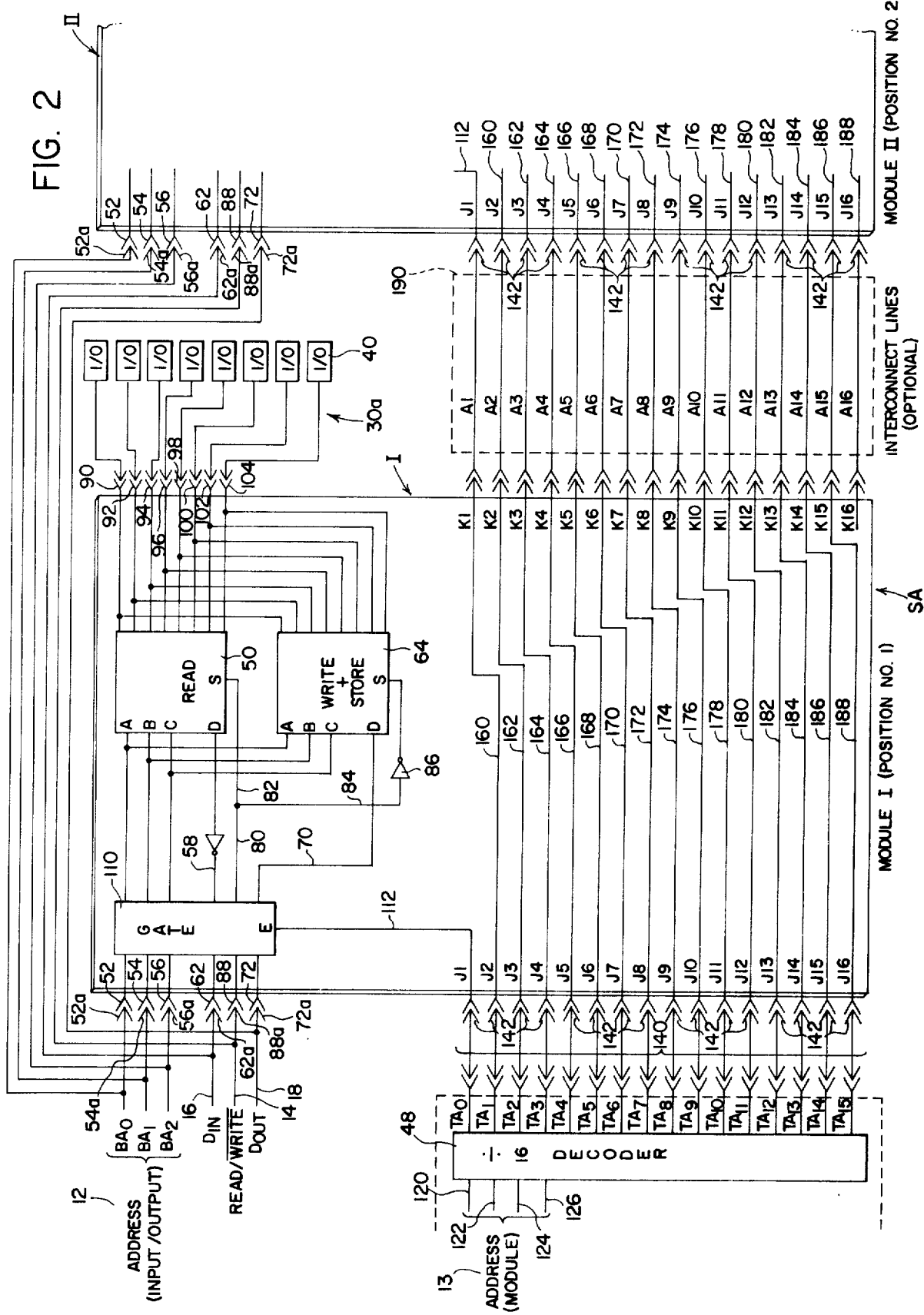
FIG. 2 is a schematic wiring and logic diagram showing the preferred embodiment of the present invention; and, FIG. 3 is a schematic wiring diagram illustrating the interconnection of the various modules in a programmable controller.

Referring now to FIG.2, the schematic layout of module I is illustrated with the interconnecting network from unit 10. Address lines $BA_0$–$BA_2$, which are lines 12 of FIG. 1, contain the address of a particular input/output unit requested from module I. This address is contained on parallel lines which are multiplexed to the various I/O modules as shown in FIG. 1 In a like manner, the input data line $D_{IN}$, i.e. line 16, and the output data line $D_{OUT}$, i.e. line 18, are multiplexed to each of the separate modules I-IV as shown in FIG. 1. The instruction line 14 is designated READ/WRITE and is also multiplexed to each of the modules. As so far explained, the particular unit addressed by the address lines $BA_0$–$BA_2$ will be either set in accordance with the data on line $D_{OUT}$ or read by line $D_{IN}$. The function will be determined by the binary condition of the instruction line (READ/WRITE). In accordance with the illustrated embodiment, a reading unit 50 provides data from a selected unit in track 40 according to the binary logic at terminals 52, 54 and 56. This data is read on line 58 which is directed to terminal 62 of module I. In order to direct this data from the module to the $D_{IN}$ line, the instruction line must be at a logic 1. to write and store data for the individual units of track 40, there is provided a write and store unit 64 having a data output line 70 connected to terminal 72 of module I. The instruction line 80 includes branches 82, 84 the latter of which includes an inverter 86. Thus, according to the logic on instruction line 80, either unit 50 or unit 64 is actuated or enabled to function in accordance with the binary code at terminals 52, 54 and 56. Each of the terminals so far described include corresponding interconnecting terminals having the same number with the subscript a. Thus, when module I is placed into position No. 1, the terminals at the upper left-hand portion of module I contact the terminals of a motherboard or other connecting mechanism. Harness portion 30a has terminals or receptacles which are connected to terminals 90–104 on the module. These module terminals are connected to the harness leads which are, in turn, connected to the individual units of track 40. An enabling gate 110 is used to enable each of the particular modules of programmable controller A. Thus, a proper logic on line 112 will actuate a particular one of the several modules so that the address code at terminals 52, 54 and 56 will select a particular output or input unit of the track controlled by the addressed module.

To enable gate 110, it is possible to include a decoding logic at each of the modules which are connected to 16 multiplexed addressed lines, one of which is energized to select one of the I/O modules. In accordance with the present invention, there is provided a self-addressing network SA. This network processes the logic code, or address, on lines 13 designated lines 120, 122, 124 and 126 in FIG. 2. These address lines are directed to 1—16 decoder 48 in the circuitry of controller A external of the modules to produce an output or module enable signal or logic in one of the lines $TA_0$–$TA_{15}$. An output in one of these lines indicates which of the I/O modules have been addressed for data processing. The parallel lines or conductors 140 carry the logic of the decoder 48 to the input terminals of the module I in position No. 1. Module I includes first input terminals J1–J16 which are connected to the terminals 142 of conductors 140 so that the logic of these conductors is directed to the 16 input terminals of I/O module I. The terminals J1–J16 are arranged on module I in a preselected pattern having a series of successive positions placed in numerical order. This numerical order is 1, 2, 3 ... n where, in the preferred embodiment n is 16.

Terminal J1 is connected to module enabling line 112. The remaining terminals J2–J16 are connected by lines 160–188 to the output terminals K1–K15. These output terminals, together with last output terminal K16, are arranged in the same preselected pattern as input terminals J1–J16. In this manner, the modules can be plugged together or use a sixteen lead harness, such as harness 22 in FIG. 1. As illustrated in FIG. 2, output terminals K1–K16 are connected to interconnecting lines A1–A16 of interconnecting wiring network 190. This network is a harness or could be a motherboard structure. The network 190, which is separate from the modules, is not used when the modules are plugged together. Interconnection by the parallel lines in network 190 or by plugging the modules together is in a successive order with J terminals on module II corresponding to the K terminals on module I. In other words, terminal K1 of module I is connected by parallel line A1 to input terminal J1 of module II. Similar parallel connections between successive modules is provided by a series of interconnecting parallel lines shown as networks 192 and 194 in FIG. 3 or by direct module interconnection.

Referring again to the J and K terminals of each module, they are arranged in the same pattern. Lines 160–188 connect these terminals with terminals J2–J16 extending to the corresponding next lower numerical position of the K terminals. The K16 terminal is disabled and provides no signal from the module.

Figure 3:
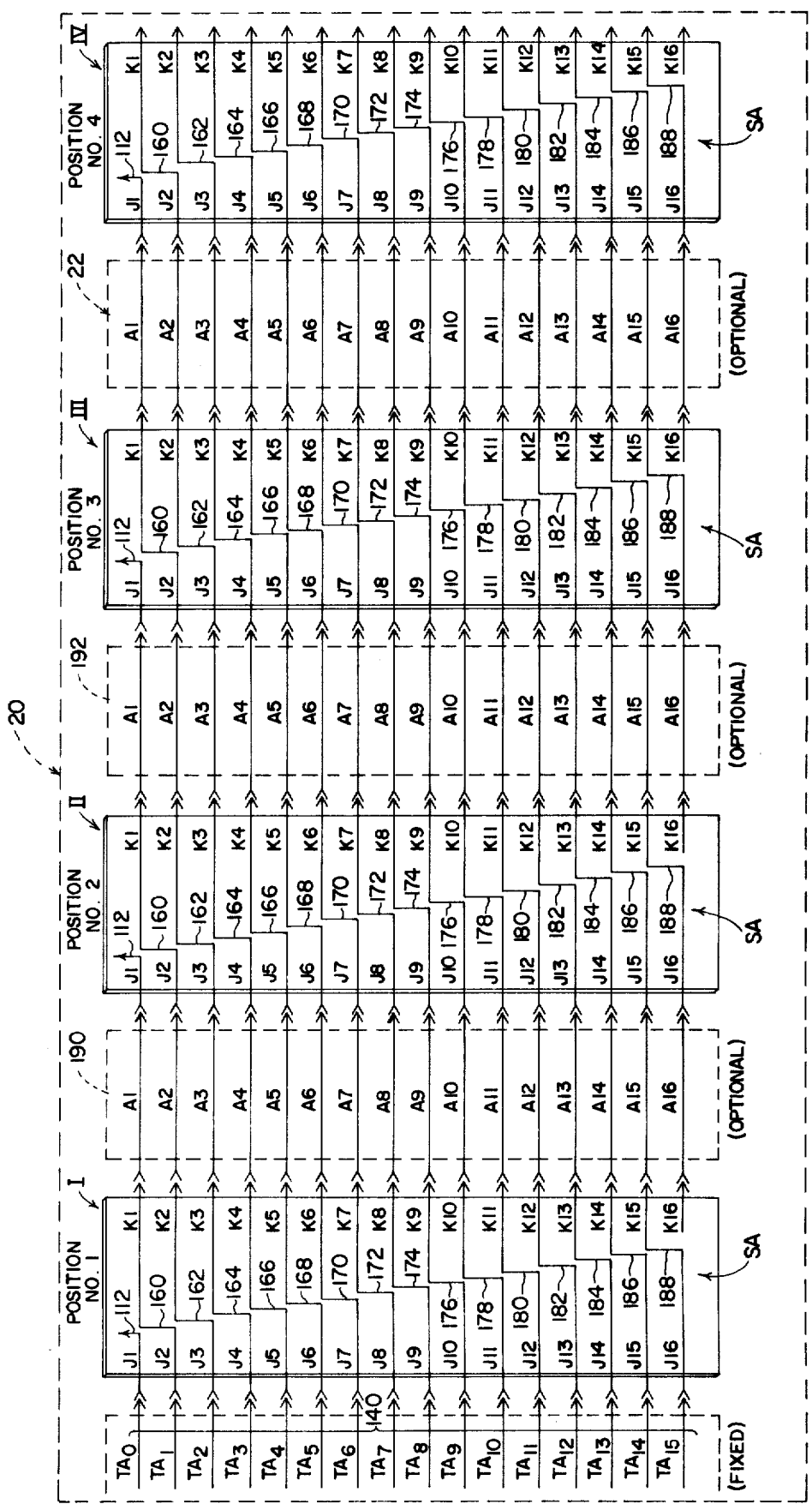

Referring now more particularly to FIG. 3, if the addressed module presents a logic on address line $TA_0$, module I is enabled since this logic is directed from $TA_0$ to line 112 by input terminal J1. If module II is to be addressed and enabled, an enabling logic or signal appears on line $TA_1$. This logic is directed through module I from input terminal J2 to output terminal K1. Thereafter, line A1 of network 190 directs the logic to terminal J1 of module II. This enables the module in the second position. If the module in the third position is to be enabled, the enabling logic or signal appears on line $TA_2$. This produces the enabling logic at terminal J3 of module I, terminal J2 of module II and through line A1 of network 192 to the J1 terminal of module III. To address the fourth module IV, the enabling logic or signal appears at the $TA_3$ line and is directed from terminal J4 to terminal K3 of module I. This logic is then transmitted through module II between terminal J3 and terminal K2. At module III the enabling logic is directed between terminal J2 and terminal K1. Finally, the enabling logic is passed through line A1 of network 194 to the J1 terminal of module IV. This produces an enabling logic at line 112 of the fourth module. This self-addressing process is schematically illustrated. As additional modules are assembled, up to sixteen modules, they can be addressed in the same manner by directing logic through the separate modules. As can be seen, this process requires that the modules be successively connected to provide the self-addressing. Each of the modules has the same terminals with the input terminals of the modules being capable of assembly directly to the output terminals of another module or connected by a standard harness or interconnecting lines of a motherboard or module support structure. The drawings show the input terminals as being female couplings and the output terminals as being male terminals. Other interconnecting arrangements are possible. The pattern of the input terminals and the output terminals is the same to allow direct interconnection of successive modules. In the preferred embodiment, the numerical J-K terminals are aligned with respect to the modules for direct connection without module offset. This allows assembly in a straight line as shown in assembly 20 of FIG. 1. Networks 190–194, when used, may be in a motherboard or may be harnesses. Except for the module in position No. 1, the last terminal J16 is not used in successive boards.

By providing the self-addressing network as explained above, there is no need to provide a decoder network on each of the separate modules. In addition, each of the separate modules can be constructed with the same terminal arrangement with the address of the module being determined by the position of the assembled module. Thus, there is no need to code the I/O modules and provide indicia of the particular coding for subsequent assembly.

Having thus described the invention, it is claimed:

1. In a module for a programmable controller, said module including logic circuits, enabling means for enabling said circuits upon receipt of an externally created module enabling signal, and conductor means on said module for conducting said module enabling signal to said enabling means, the improvement comprising: at least first, second and third input terminals arranged on said module in a preselected pattern having a first position, second position and third position; at least first, second and third output terminals arranged in said preselected pattern; said first input terminal being in said first position and electrically connected to said conductor means; said second input terminal being in said second position and connected to said first output terminal in said first position of said pattern; said third input terminal being in said third position and connected to said second output terminal in said second position of said pattern; said third output terminal being electrically isolated from said input terminals; and means for connecting said first, second and third input terminals to external first, second and third conductors, respectively, and an external decoding means for directing said module enabling signal to said first of said conductors only when said module is to be enabled and said decoding means directing said module enabling signal to said second and third conductors when said first and second output terminals, respectively, are to receive said module enabling signal.

2. The improvement as defined in claim 1 wherein said input terminals are located at a first preselected position on said module and said output terminals are located at a second preselected position, with said first and second preselected positions being mutually aligned.

3. In a module for a programmable controller, said module including logic circuits, enabling means for enabling said circuits upon receipt of a module enabling signal, and conductor means on said module for conducting said module enabling signal to said enabling means, the improvement comprising: a set of input terminals arranged on said module in a preselected pattern having a successive numerical order of 1, 2, 3 ... n; a set of output terminals arranged on said module in said preselected pattern; means on said module for connecting said input terminal in said number one position to said conductor means; means on said module for connecting each of the remaining input terminals to output terminals in the corresponding next lower numerical positions of said preselected pattern of output terminals.

4. The improvement as defined in claim 3 wherein said input terminals are located at a first preselected position on said module and said output terminals are located at a second preselected position on said module, with said first and second preselected positions being mutually aligned.

5. The improvement as defined in claim 4 wherein n is 16.

6. The improvement as defined in claim 3 wherein n is 16.

* * * * *

Disclaimer 4,050,098.—*William H. Seipp*, Bettendorf, Iowa. SELF-ADDRESSING MODULES FOR PROGRAMMABLE CONTROLLER. Patent dated Sept. 20, 1977. Disclaimer filed July 25, 1980, by the assignee, *Gulf & Western Industries, Inc.*

Hereby enters this disclaimer to claims 3 and 4 of said patent.

[*Official Gazette September 9, 1980.*]